US006805761B1

(12) United States Patent
Kato et al.

(10) Patent No.: US 6,805,761 B1
(45) Date of Patent: Oct. 19, 2004

(54) MAGNETIC DISC CARTRIDGE, METHOD OF MANUFACTURING THE SAME AND METHOD OF CLEANING LINERS OF THE SAME

(75) Inventors: Shinichi Kato, Kanagawa-ken (JP); Akira Mizuta, Kanagawa-ken (JP); Yoichi Hayashi, Kanagawa-ken (JP)

(73) Assignee: Fuji Photo Film Co., Ltd., Kanagawa-ken (JP)

( * ) Notice: Subject to any disclaimer, the term of this patent is extended or adjusted under 35 U.S.C. 154(b) by 0 days.

(21) Appl. No.: 09/720,597

(22) PCT Filed: Jun. 18, 1999

(86) PCT No.: PCT/JP99/03247
§ 371 (c)(1),
(2), (4) Date: Dec. 26, 2000

(87) PCT Pub. No.: WO99/67785
PCT Pub. Date: Dec. 29, 1999

(30) Foreign Application Priority Data

Jun. 24, 1998 (JP) .......................................... 10-176894

(51) Int. Cl.[7] .............................................. B29C 65/08
(52) U.S. Cl. ..................... 156/73.1; 156/281; 156/290; 156/308.4
(58) Field of Search ............................... 156/73.1, 281, 156/290, 308.2, 308.4, 498, 553, 580.1, 580.2

(56) References Cited

U.S. PATENT DOCUMENTS

| 4,773,293 A | 9/1988 | Mizuta et al. ................. 83/39 |
| 4,814,927 A | 3/1989 | Iwamoto et al. ............ 360/133 |
| 5,115,961 A | 5/1992 | Nakajima et al. ........... 228/111 |
| 5,687,048 A | 11/1997 | Mizuta ........................ 360/133 |
| 5,705,004 A | 1/1998 | Watanabe ..................... 156/83 |
| 5,850,327 A * | 12/1998 | Mizuta ........................ 360/133 |
| 5,920,450 A * | 7/1999 | Fujiwara et al. ............ 360/133 |

FOREIGN PATENT DOCUMENTS

| DE | 39 41 334 | 6/1990 | |
| DE | 39 41 334 A1 | 6/1990 | ......... G11B/23/113 |
| EP | 0 308 161 | 3/1989 | ........... G11B/23/03 |
| EP | 0 309 727 A2 | 4/1989 | |
| EP | 0 309 727 | 4/1989 | ......... G11B/23/033 |
| JP | 7-272437 | 10/1995 | ......... G11B/23/113 |
| JP | 8-203234 | 8/1996 | ........... G11B/23/03 |

OTHER PUBLICATIONS

International Search Report.

* cited by examiner

Primary Examiner—James Sells
(74) Attorney, Agent, or Firm—Sughrue Mion, PLLC

(57) ABSTRACT

A magnetic disc cartridge includes a casing formed of upper and lower shell halves mated together, a disc-like recording medium supported for rotation in the casing and a liner fixed to each of the inner surfaces of the upper and lower shell halves by ultrasonic welding by use of an ultrasonic welding horn. The liner has an outer contour defined by an outer peripheral edge, a central opening defined by an inner peripheral edge, and a slit-like cutaway portion defined by a pair of linear edges extending between the outer peripheral edge and the inner peripheral edge. The ultrasonic welding horn is provided with a welding pattern in the form of a protrusion pattern formed on a welding face thereof over the entire welding area in which the ultrasonic welding horn is brought into contact with the liner, and the liner is welded to the inner surface of the shell half over the entire area of the liner along the welding pattern.

6 Claims, 14 Drawing Sheets

F I G. 1
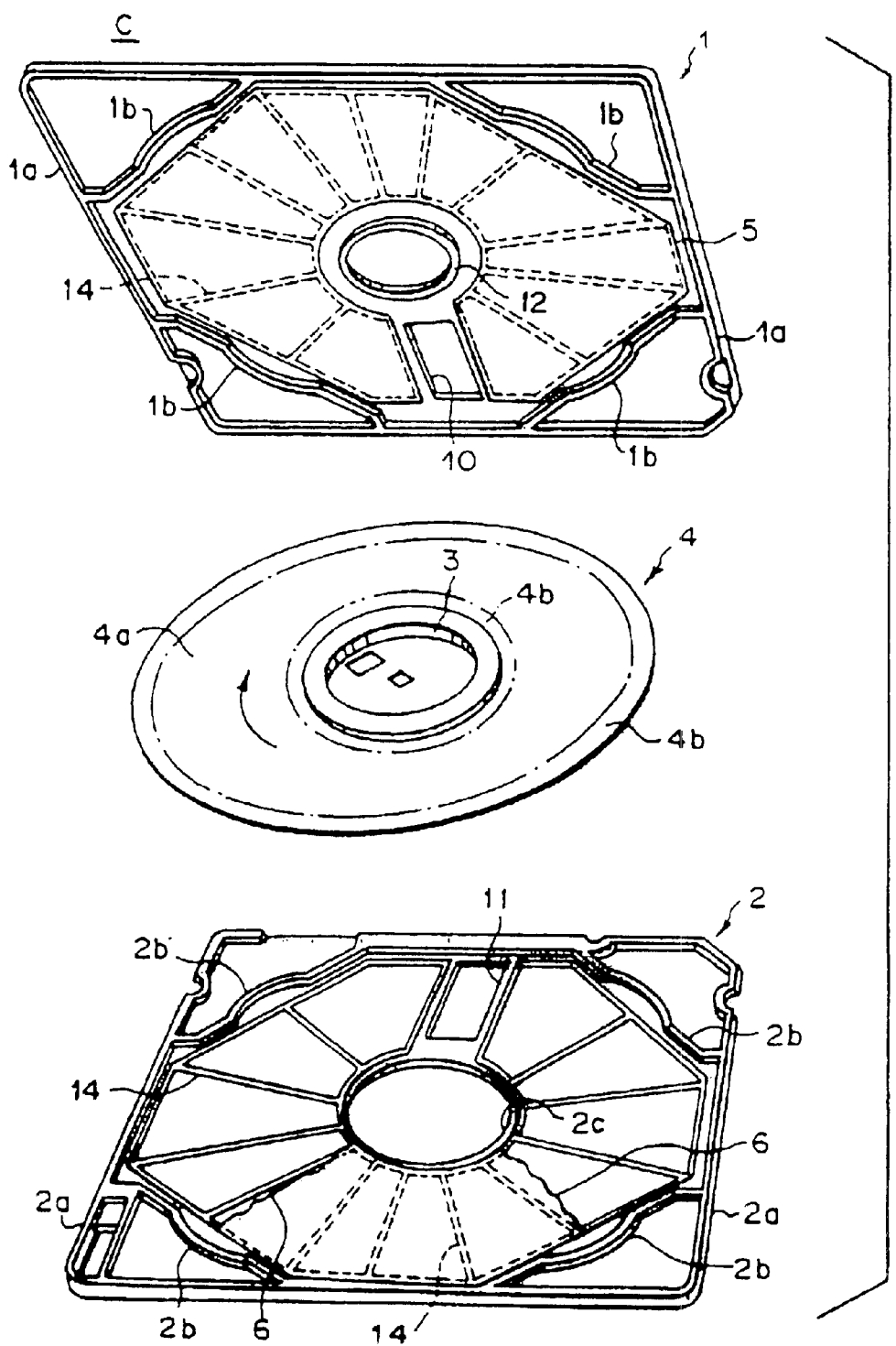

F I G. 15A
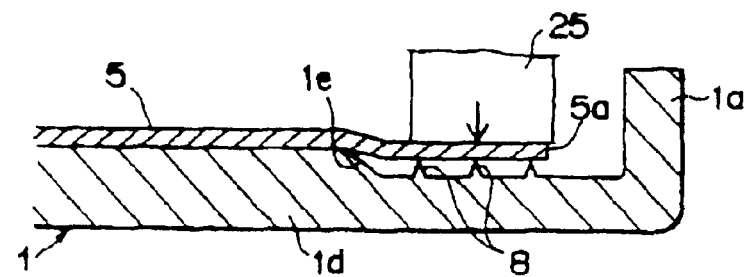
F I G. 15B
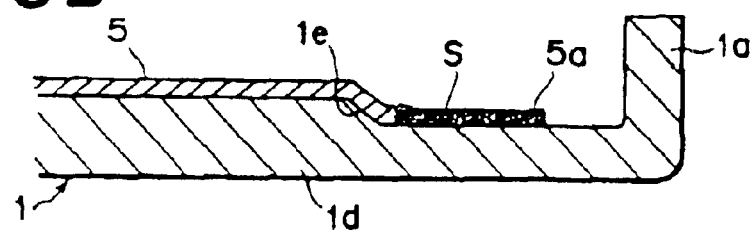
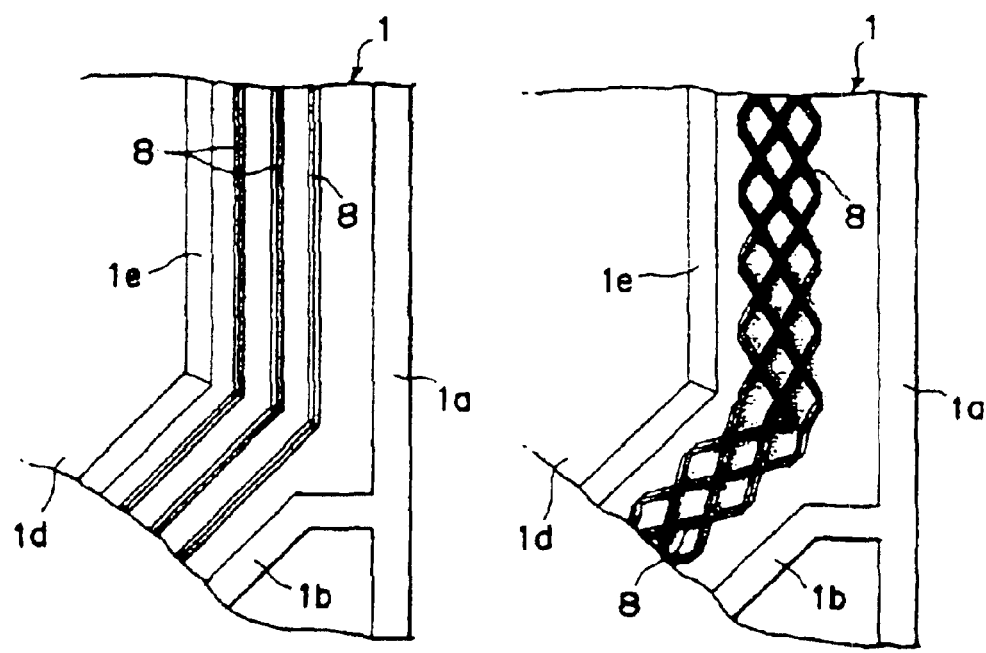
F I G. 16A  F I G. 16B

MAGNETIC DISC CARTRIDGE, METHOD OF MANUFACTURING THE SAME AND METHOD OF CLEANING LINERS OF THE SAME

FIELD OF THE INVENTION

This invention relates to a magnetic disc cartridge, and more particularly to a magnetic disc cartridge comprising a casing formed of upper and lower shell halves mated together, a disc-like recording medium supported for rotation in the casing and a pair of liners respectively fixed to the inner surfaces of the upper and lower shell halves and to a method of manufacturing the same. This invention also relates to a method of cleaning the liners.

BACKGROUND OF THE INVENTION

In a magnetic disc cartridge comprising a disc-like recording medium supported for rotation in a casing formed of upper and lower shell halves, a pair of liners formed of nonwoven fabric or the like are generally fixed to the inner surfaces of the upper and lower shell halves, respectively.

The liners are for protecting the recording medium and are formed of nonwoven fabric or the like of rayon or the like in a predetermined shape. The liners are fixed to the inner surfaces of the upper and lower shell halves by welding such as ultrasonic welding.

Each liner is generally octagonal in contour and is provided with a central opening and a slit-like cutaway portion which is opposed to the magnetic head insertion opening formed in the corresponding shell half.

When welding the liner to the shell half, a welding horn is pressed against the liner placed on the inner surface of the shell half and heat or ultrasonic vibration is applied to the welding horn, thereby fusing the inner surface of the shell half to the liner.

For example, there has been proposed in Japanese Patent Application No. 9(1997)-296838, a method of fixing a liner to the inner surface of a shell half by ultrasonic welding in which an energy director in the form of a protrusion is formed in a predetermined pattern on the inner surface of the shell half, the liner is placed on the energy director, and an ultrasonic welding horn is pressed against the liner so that the energy director is fused to the liner.

In the past, the liner is fixed to the shell half only at a part of its peripheral edge. Accordingly the non-fixed part of the peripheral edge and/or the central portion of the liner is in a floating condition and can be brought into contact with the recording medium. However, recently, as the recording capacity of the recording medium increases, it becomes necessary to rotate the recording medium at a higher speed. When the recording medium rotated at a high speed is constantly in contact with the liner, contaminants can be produced, for instance, by separation of fibers from the liner. When such contaminants adhere to the recording medium and/or the magnetic head, recording and reproducing performance can be adversely affected, recording medium driving torque can be increased, and the recording medium can wobble during rotation. Accordingly, there is a tendency to reduce contact of the liner to the recording medium.

Further since the liner is stamped out from a sheet of unwoven fabric, when the liner is not welded over its entire peripheral edge, cut fibers can drop from its peripheral edge and can adhere to the surface of the recording medium to cause drop out.

Further since the liner is formed of a hygroscopic material such as rayon, when the central portion of liner is not fixed to the inner surface of the shell half, the liner is deformed in such a manner that the central portion bulges upward due to hygroscopicity under the conditions of 60° C. in temperature and 90% in humidity. When the liner is thus deformed, the bulging portion is brought into contact with the recording medium which rotating at a high speed, which gives rise to the aforesaid problems.

SUMMARY OF THE INVENTION

In view of the foregoing observations and description, the primary object of the present invention is to provide a method of manufacturing a magnetic disc cartridge which can prevent fibers from dropping from the peripheral edges of the liners and can prevent the liners from constantly contacting with the rotating recording medium.

Another object of the present invention is to provide a method of manufacturing a magnetic disc cartridge which can prevent the central portions of the liners from bulging into contact with the recording medium even if they absorb moisture.

Still another object of the present invention is to provide a magnetic disc cartridge in which the recording medium can be effectively cleaned by the liners without substantially increasing the recording medium drive torque.

Still another object of the present invention is to provide a method of cleaning a liner of a magnetic disc cartridge which can effectively remove dust and free fibers from the liner without damaging the casing and/or the recording medium.

In accordance with a first aspect of the present invention, there is provided a method of manufacturing a magnetic disc cartridge comprising a casing formed of upper and lower shell halves mated together, a disc-like recording medium supported for rotation in the casing and an octagonal liner fixed to each of the inner surfaces of the upper and lower shell halves by use of a welding horn, the liner having a substantially octagonal outer contour defined by an outer peripheral edge, a central opening defined by an inner peripheral edge, and a slit-like cutaway portion defined by a pair of linear edges extending between the outer peripheral edge and the inner peripheral edge, which method is characterized in that the welding horn has a welding face (the front end face) whose outer contour is an octagon conforming to the outer contour of the liner so that the liner is welded to the inner surface of the shell half substantially over the entire outer peripheral edge thereof.

It is preferred that the liner be welded to the inner surface of the shell half substantially over the entire outer peripheral edge, the inner peripheral edge and the linear edges.

The liner need not be welded to the inner surface of the shell half continuously over the edges described above but may be welded at a plurality of spots along the edges provided that the spots are sufficiently closely arranged to prevent fibers from dropping from the edges.

The liner may be welded to the inner surface of the shell half by forming an energy director protrusion on the inner surface of the shell half along the edge or edges of the liner to be welded or by forming a protrusion on the welding face of the welding horn along the edge or edges of the liner to be welded.

It is preferred that the liner be electrostatically processed to attract and hold fiber dust.

In accordance with a second aspect of the present invention, the surface of an edge portion of the liner facing the recording medium is made more distant from the recording medium than the other part of the liner and fixing agent is caused to soak into the edge portion and is solidified there.

The surface of an edge portion of the liner facing the recording medium may be made more distant from the recording medium than the other part of the liner, for instance, by forming a recess in the inner surface of the shell half or by compressing the part of the liner with the inner surface of the shell half held flat.

The fixing agent may be adhesive applied to the liner or may be molten resin obtained by fusing the shell half by applying heat or ultrasonic vibration.

In accordance with a third aspect of the present invention, there is provided a method of manufacturing a magnetic disc cartridge comprising a casing formed of upper and lower shell halves mated together, a disc-like recording medium supported for rotation in the casing and a liner fixed to each of the inner surfaces of the upper and lower shell halves by ultrasonic welding by use of an ultrasonic welding horn, the liner having an outer contour defined by an outer peripheral edge, a central opening defined by an inner peripheral edge, and a slit-like cutaway portion defined by a pair of linear edges extending between the outer peripheral edge and the inner peripheral edge, which method is characterized in that said ultrasonic welding horn is provided with a welding pattern in the form of a protrusion pattern formed on a welding face thereof over the entire welding area in which the ultrasonic welding horn is brought into contact with the liner, and the liner is welded to the inner surface of the shell half over the entire area of the liner along the welding pattern.

The welding pattern may be a longitudinal or transverse stripe pattern, a grid pattern, a radial pattern or the like. It is preferred that the welding pattern be uniformly spaced over the entire area of the liner opposed to the recording area of the recording medium. Further the welding pattern may be of the same form over the entire area of the liner or may be of different forms between the edge portion of the liner along the edges of the liner and the inner portion of the liner opposed to the recording area of the recording medium.

In accordance with the method of the third aspect of the present invention, the liner is welded to the inner surface of the shell half along the welding pattern over the entire area of the liner and accordingly the liner cannot largely bulge even if the liner absorbs moisture, whereby the liner is prevented from contacting the recording medium rotating at a high speed. Accordingly, production of contaminants and increase of the recording medium driving torque can be suppressed, and the recording medium can be prevented from wobbling during rotation, whereby good recording and reproducing characteristics can be ensured and the recording medium can be stably rotated at a high speed.

In the case where the energy director in the form of a protrusion formed on the inner surface of the shell half is fused, fused components can penetrate through the liner up to the surface thereof and can be solidified there. When the recording medium is brought into contact the solidified components, recording quality can be deteriorated. To the contrast, when the ultrasonic welding horn is provided with the welding pattern in the form of a protrusion pattern and the inner surface of the shell half is flat, fused components of the shell half less penetrates through the liner up to the surface thereof and accordingly even if the solidified components of the shell half is brought into contact with the recording medium, the recording quality is less affected.

In accordance with a fourth aspect of the present invention, there is provided a magnetic disc cartridge comprising a casing formed of upper and lower shell halves mated together, a disc-like recording medium supported for rotation in the casing and a pair of liners respectively fixed to the inner surfaces of the upper and lower shell halves, each of the upper and lower shell halves being provided with a magnetic head insertion opening and each of the liners having a slit-like cutaway portion opposed to the magnetic head insertion opening of the corresponding shell half, wherein the improvement comprises that a part of each of the liners extending upstream from the edge of the cutaway portion as seen in the direction of rotation of the recording medium is not fixed to the inner surface of the shell half so that the unfixed part can float from the inner surface of the shell half into contact with the surface of the recording medium.

It is preferred that at least an edge portion of the part of the unfixed part of the liner to be brought into contact with the recording medium be subjected to fiber fixing treatment for preventing hairiness and separation of fibers. Such fiber fixing treatment may involve, for instance, application of adhesive, or heat fusing. The edge portion of the part of the unfixed part of the liner may be further subjected to chemical dust treatment for enhancing dust adsorbability.

It is preferred that the unfixed part be formed within 60° from the center of the magnetic head insertion window as measured in the direction of rotation of the recording medium in view of ensuring sufficient dust wiping action without excessively increasing the recording medium drive resistance.

When a resilient member or a rigid member is disposed between the unfixed part and the inner surface of the shell half to urge the unfixed part toward the recording medium, the unfixed part can be surely brought into contact with the surface of the recording medium and dust wiping action is enhanced. For example, the resilient member may be formed of the same material as the liner and the rigid member may be in the form of a rib formed on the inner surface of the shell half.

In accordance with a fifth aspect of the present invention, there is provided a method of cleaning a liner of a magnetic disc cartridge comprising a casing formed of upper and lower shell halves mated together, a disc-like recording medium supported for rotation in the casing and a pair of liners respectively fixed to the inner surfaces of the upper and lower shell halves, which method comprising the steps of positioning each of the shell halves bearing thereon the liner fixed thereto with the surface of the liner opposed to a front end face of an ultrasonic welding horn at a predetermined space therefrom, vibrating the liner by ultrasonic wave radiated from the front end face of the ultrasonic welding horn, and blowing an air flow against the surface of the liner.

It is preferred that the distance between the liner and the front end face of the ultrasonic welding horn be an integral multiple of a half wavelength of the ultrasonic wave as propagating in the air.

Further the ultrasonic welding horn may be moved relatively to the liner in a range including an integral multiple of a half wavelength of the ultrasonic wave as propagating in the air.

In accordance with a sixth aspect of the present invention, there is provided a method of cleaning a liner of a magnetic disc cartridge comprising a casing formed of upper and lower shell halves mated together, a disc-like recording medium supported for rotation in the casing and a pair of liners respectively fixed to the inner surfaces of the upper and lower shell halves, which method comprising the steps of bringing each of the shell halves bearing thereon the liner fixed thereto into contact with an ultrasonic welding horn, vibrating the liner by ultrasonic wave applied to the shell half from the ultrasonic welding horn, and blowing an air flow against the surface of the liner.

It is preferred that the shell half be supported by an elastic means disposed on the side of the shell half remote from the ultrasonic welding horn.

The shell half may be placed on a support table supported by an air cylinder.

BRIEF DESCRIPTION OF THE DRAWINGS

FIG. 1 is an exploded perspective view of a magnetic disc cartridge manufactured by a method in accordance with a first embodiment of the present invention, FIGS. 15A and 15B are views for illustrating another example of the method of bonding the liner to the shell half by welding in the third embodiment, FIGS. 16A and 16B are views for illustrating examples of the protrusion pattern to be formed on the inner surface of the shell half.

PREFERRED EMBODIMENT OF THE INVENTION

Figure 2:
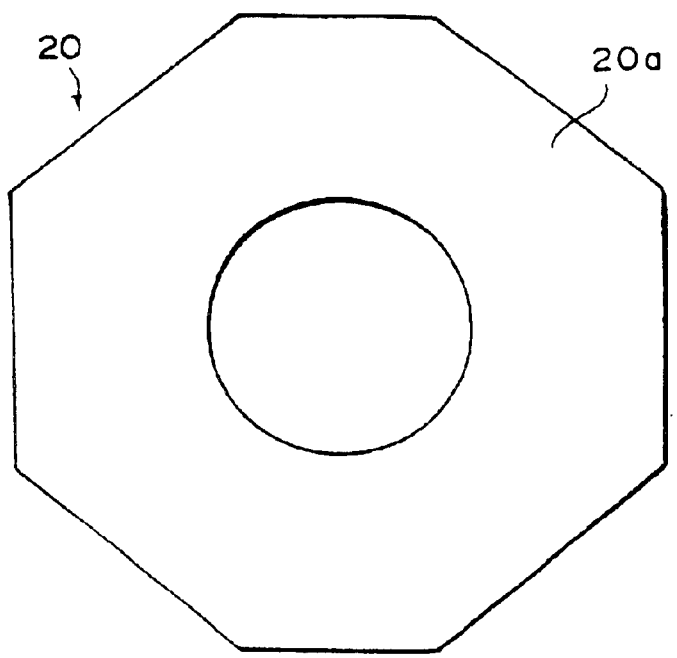
FIG. 2 is a view showing an example of the shape of the welding face of the ultrasonic welding horn employed for carrying out the method of the first embodiment.

In FIG. 1, a magnetic disc cartridge manufactured by a method in accordance with a first embodiment of the present invention comprises a flat casing C formed of upper and lower shell halves 1 and 2 which are formed of synthetic resin such as acrylonitrile-butadiene-styrene copolymer. A recording medium (magnetic disc) 4 with a central core member 3 mounted on the center thereof is supported for rotation in the casing C. An upper liner 5 is fixed to the inner surface of the upper shell half 1 and a lower liner 6 is fixed to the inner surface of the lower shell half 2.

The recording medium 4 comprises a flexible disc-like base formed of resin such as polyethylene terephtalate and magnetic layers formed on opposite sides of the base. Inner and outer peripheral edge portions of the recording medium 4 form a non-recording area 4b and the annular portion between the inner and outer peripheral edge portions forms a recording area 4a.

The upper and lower shell halves 1 and 2 are flat and square in shape, and are provided with outer peripheral ribs 1a and 2a which form side walls of the casing C. Inner ribs 1b and 2b are formed to extend obliquely at each corner of the upper and lower shell halves 1 and 2 and magnetic head insertion openings 10 and 11 are formed in the respective shell halves 1 and 2. A spindle hole 2c through which a spindle of a recording and reproducing system acts on the center core member 3 is formed in the lower shell half 2 at the center thereof. Though not shown, a shutter member is mounted on the casing C to be slidable left and right to close and open the magnetic head insertion openings 10 and 11.

The upper and lower liners 5 and 6 are fixed by ultrasonic welding to inner surfaces of the upper and lower shell halves 1 and 2 inside the inner ribs 1b and 2b. The middle portion of each inner ribs 1b and 2b are curved to extend along the outer peripheral edge of the recording medium 4.

An annular protrusion 12 extends downward from the inner surface of the upper casing half 1 at the center thereof and is fitted in the central core member 3 on the recording medium 4, thereby limiting movement of the recording medium 4 in the radial direction thereof relative to the casing C.

The liners 5 and 6 are of the same shape and substantially octagonal in outer contour. Each liner is provided with a slit at a portion opposed to the magnetic head insertion opening (10 or 11) and a central opening which is slightly larger than the annular protrusion 12 or the spindle hole 2c. Each liner is formed of, for instance, unwoven fabric such as of a blend of rayon and PET or nylon. Unwoven fabric of a blend of continuous fibers of cotton cellulose (70%) and PET fibers (30%) is advantageous in that separation of fibers is less.

Each of the upper and lower shell halves 1 and 2 is provided with an energy director 14 in the form of a protrusion formed on the inner surface of the shell half in a predetermined pattern. In the example shown in FIG. 1, the pattern of the energy director 14 comprises an edge portion pattern formed of a protrusion extending along the outer peripheral edge, the inner peripheral edge and the linear edges of the slit of the liner and an inside pattern formed of a plurality of radial protrusions extending from the part of the edge portion pattern extending along the inner peripheral edge defining the central opening to the part of the same extending along the outer peripheral edge.

The energy director 14 may be formed of a continuous protrusion which is triangular in cross-section or of a plurality of discontinuous protrusions. The radial protrusions in the inside pattern may be more densely formed or less densely formed though it is preferred that they are arranged at substantially regular intervals in the circumferential direction.

The liners 5 and 6 are fixed to the inner surfaces of the respective shell halves 1 and 2 by ultrasonic welding by use of an ultrasonic welding horn 20 having a welding face 20a which is octagonal in outer contour as shown in FIG. 2. The welding face 20a is substantially the same as the liners 5 and 6 in shape and dimensions. That is, the welding face 20a of the ultrasonic welding horn 20 is substantially octagonal in outer contour and is provided with a central opening corresponding to the central opening of the liner.

When welding the liner to the shell half by use of the ultrasonic welding horn 20, the shell half (1 or 2) is placed on a support table of an ultrasonic welding machine and the liner (5 or 6) is set to the inner surface of the shell half in a predetermined position. Then the welding face 20a of the ultrasonic welding horn 20 is pressed against the liner and ultrasonic vibration is applied to the ultrasonic welding horn 20, whereby the energy director 14 is fused and welded to the liner.

Figure 3:
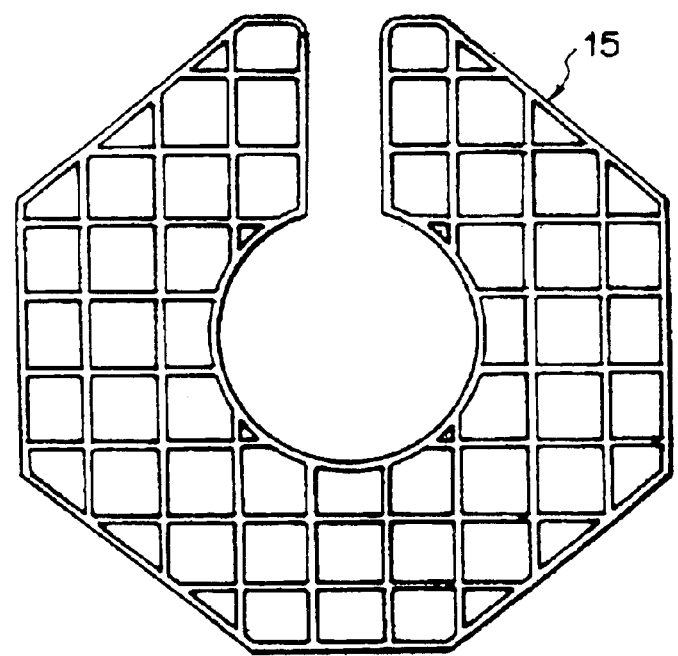
FIG. 3 is a view showing a modification of the pattern of the energy director to be formed on the inner surface of the shell half.

The pattern of the energy director 15 shown in FIG. 3 comprises an edge portion pattern formed of a protrusion extending along the outer peripheral edge, the inner peripheral edge and the linear edges of the slit of the liner and an inside pattern formed of a plurality of longitudinal and transverse protrusions intersecting each other in a grid pattern.

The inside pattern may be formed of a protrusion or protrusions formed in a stripe pattern, a helical pattern, a concentric circle pattern.

It is preferred that each protrusion forming the energy director be triangular in cross-section and about 0.1 mm in width of its top.

Figure 4:
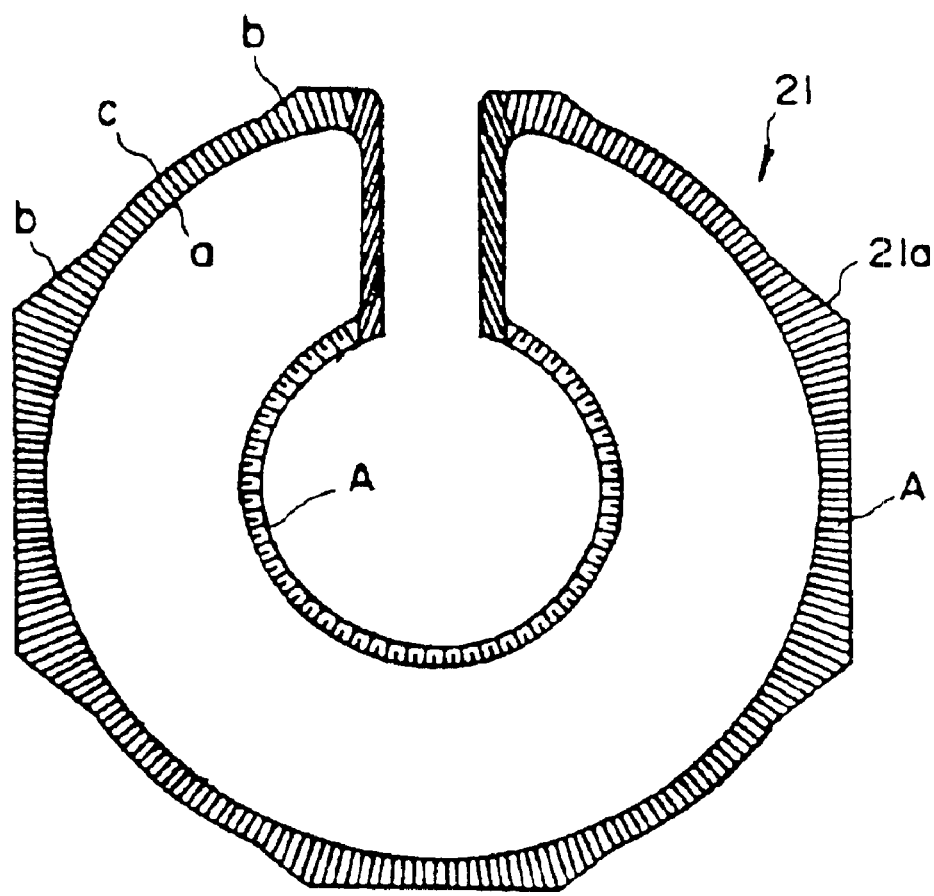
FIG. 4 is a view showing another example of the shape of the welding face of the ultrasonic welding horn employed for carrying out the method of the first embodiment.

Instead of forming an energy director on the inner surface of the shell half, a welding pattern in the form of a protrusion pattern may be formed on the welding face of the ultrasonic welding horn as shown in FIG. 4.

In FIG. 4, an ultrasonic welding horn 21 has a welding face 21a which is substantially equal to the liner in shape and size. The welding face 21a is provided with a welding pattern A in the form of a protrusion pattern formed along the outer peripheral edge, the inner peripheral edge and the linear edges of the slit of the liner. The welding pattern A is formed of a plurality of radial protrusions arranged at a high density (e.g., at intervals of 1 mm) at the part along the outer peripheral edge of the welding face 21a, of a plurality of long and short radial protrusions which are alternately arranged at the part along the inner peripheral edge of the welding face 21a, and of a plurality of inclined protrusions arranged at a higher density at the part along the opposite edges of the slit. It is preferred that each protrusion forming the welding pattern be triangular in cross-section and about 0.1 mm in width of its top.

Each of the four sides of the octagonal welding face 21a corresponding to the four sides of the liner which are opposed to the four corners of the shell half is arcuately bulges outward beyond the outer peripheral edge of the liner. In FIG. 4, inner line a of the welding pattern A corresponds to the outer peripheral edge of the recording area 4a of the recording medium 4, inclined linear lines b correspond to the outer peripheral edge of the liner and outer arcuate lines c of the bulging portion correspond to the outer peripheral edge of the recording medium 4.

The ultrasonic welding horn 21 is for welding the liner to the inner surface of the shell half at the portion outside the recording area 4a. But for the bulging portion indicated at c, the width of the welding pattern becomes too small at the middle of the inclined sides opposed to the corners of the shell half. Accordingly, by increasing the width of the welding pattern there within a range in which the welding face of the ultrasonic welding horn does not interfere with the inner ribs 1b and 2b of the shell halves 1 and 2, production of the welding pattern is facilitated.

Though, in the embodiment described above, the liner is welded by ultrasonic welding, it may be welded by heat-welding. Further when the liner is electrostatically processed, the liner can attract dust and prevent dust from adhering to the recording medium 4.

A magnetic disc cartridge manufactured by a method in accordance with a second embodiment of the present invention will be described with reference to FIGS. 5 to 8, hereinbelow.

Figure 5:
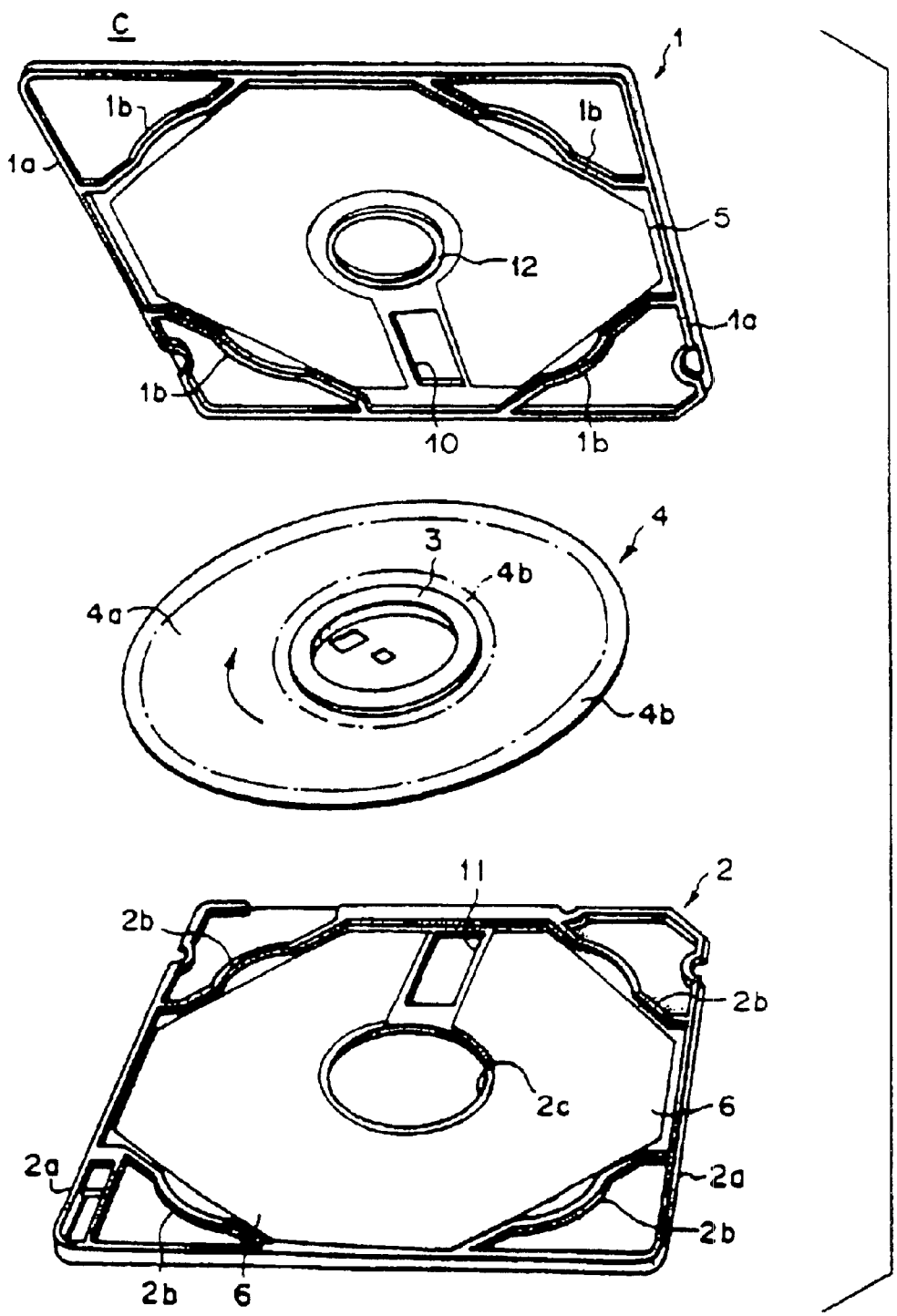
FIG. 5 is an exploded perspective view of a magnetic disc cartridge manufactured by a method in accordance with a second embodiment of the present invention.

FIG. 5 shows a magnetic disc cartridge C manufactured by a method in accordance with the second embodiment of the present invention. The magnetic disc cartridge shown in FIG. 5 is substantially the same as that shown in FIG. 1 except that the inner surfaces of the upper and lower shell halves are not provided with an energy director and are substantially flat at the part where the liners are fixed. Accordingly, the elements analogous to those shown in FIG. 1 are given the same reference numerals and will not be described here.

As shown in FIG. 5, the inner surfaces of the shell halves 1 and 2 are substantially flat inside the inner ribs 1b and 2b.

Figure 6:
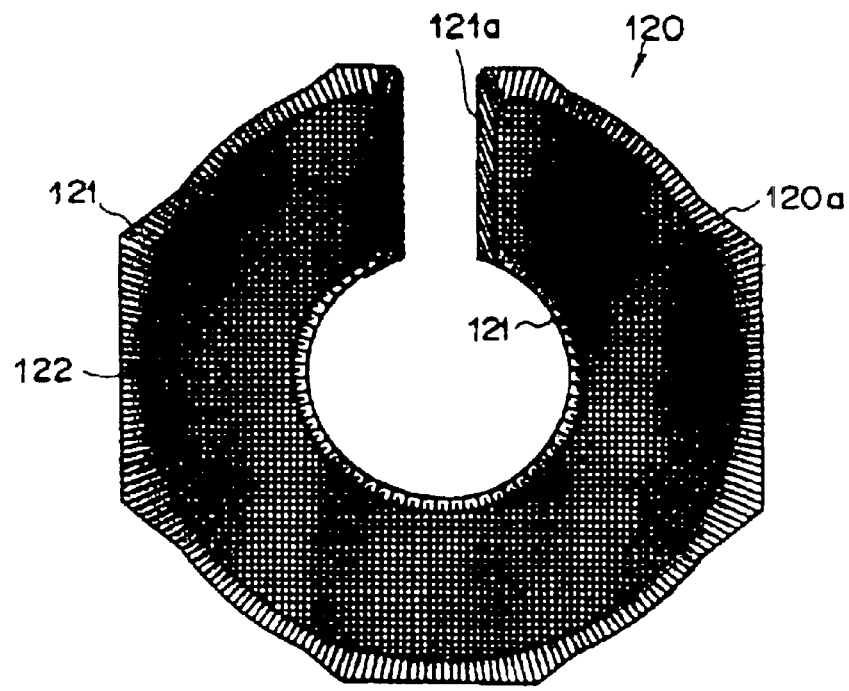
FIG. 6 is a view showing an example of the welding pattern to be formed on the welding face of the ultrasonic welding horn.

The liners 5 and 6 are fixed to the inner surfaces of the respective shell halves 1 and 2 by ultrasonic welding by use of an ultrasonic welding horn 120 (FIG. 6). As shown in FIG. 6, the ultrasonic welding horn 120 has an octagonal welding face 120a which is substantially the same as the liners 5 and 6 in shape and dimensions. The welding face 120a of the ultrasonic welding horn 120 is provided with a central opening corresponding to the central opening of the liner and a slit corresponding to the slit of the liner. A welding pattern in the form of a protrusion pattern is formed over the entire area of the welding face 120a of the ultrasonic welding horn 120.

Each of the four sides of the octagonal welding face 120a corresponding to the four sides of the liner which are opposed to the four corners of the shell half is arcuately bulges outward beyond the outer peripheral edge of the liner. The radius of curvature of the bulging portion is substantially equal to that of the outer peripheral edge of the recording medium 4.

The example of the welding pattern shown in FIG. 6 comprises an edge portion pattern 121 and an inner side pattern 122. The edge portion pattern 121 is formed along the outer peripheral edge, the inner peripheral edge of the welding face 120a and along the opposite edges of the slit of the same (121a). The edge portion pattern 121 is formed of a plurality of radial protrusions arranged at a high density at the part along the outer peripheral edge of the welding face 120a, of a plurality of long and short radial protrusions which are alternately arranged at the part along the inner peripheral edge of the welding face 120a, and of a plurality of inclined protrusions arranged at a higher density at the part 121a along the opposite edges of the slit. The inner side pattern 122 is formed of a plurality of longitudinal protrusions and transverse protrusions which intersect each other to form a grid pattern. Each of the longitudinal and transverse protrusions may be discontinuous.

In FIG. 6 (and also in FIGS. 7 and 8), the lines but those representing the contour of the welding face 120a of the ultrasonic welding horn 120 and the boundary between the edge portion pattern 121 and the inner side pattern 122 (a thin groove) show the top (welding line) of the protrusions forming the welding pattern. The welding lines are formed at pitches of 1 to 2 mm.

When welding the liner to the shell half by use of the ultrasonic welding horn 120, the shell half (1 or 2) is placed on a support table of an ultrasonic welding machine and the liner (5 or 6) is set to the inner surface of the shell half in a predetermined position. Then the welding face 120a of the ultrasonic welding horn 120 is pressed against the liner and ultrasonic vibration is applied to the ultrasonic welding horn 120, whereby the portion of the inner surface of the shell half opposed to the welding pattern is fused and welded to the liner.

Figure 7:
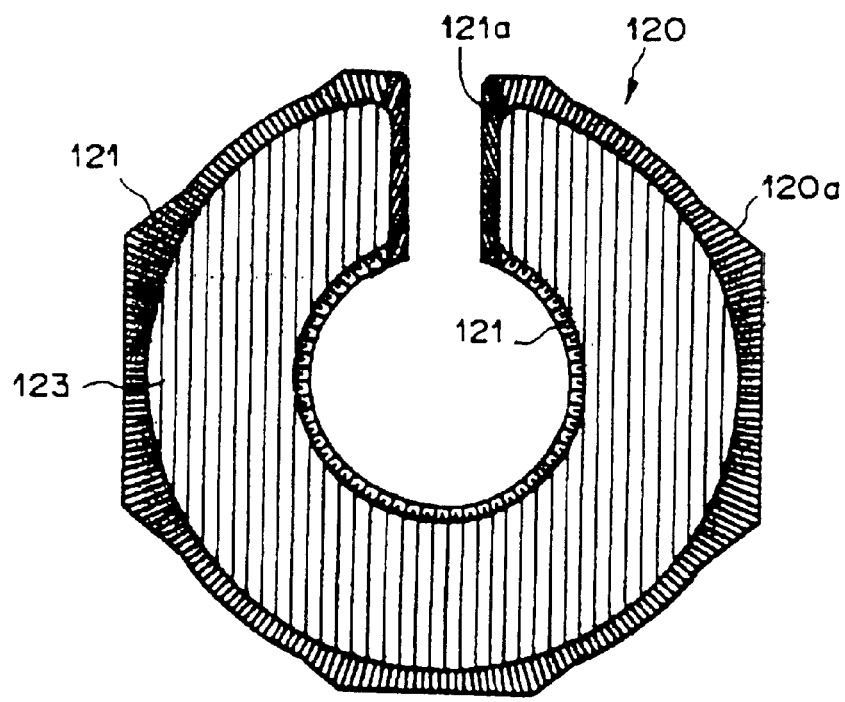
FIG. 7 is a view showing another example of the welding pattern to be formed on the welding face of the ultrasonic welding horn.

The welding pattern shown in FIG. 7 differs from that shown in FIG. 6 in that the inner side pattern 123 is a longitudinal stripe pattern formed of a plurality of parallel longitudinal protrusions (each of which may be of either a continuous protrusion or a plurality of discontinuous protrusions). The stripe pattern may be formed of a plurality of transverse or inclined protrusions.

Figure 8:
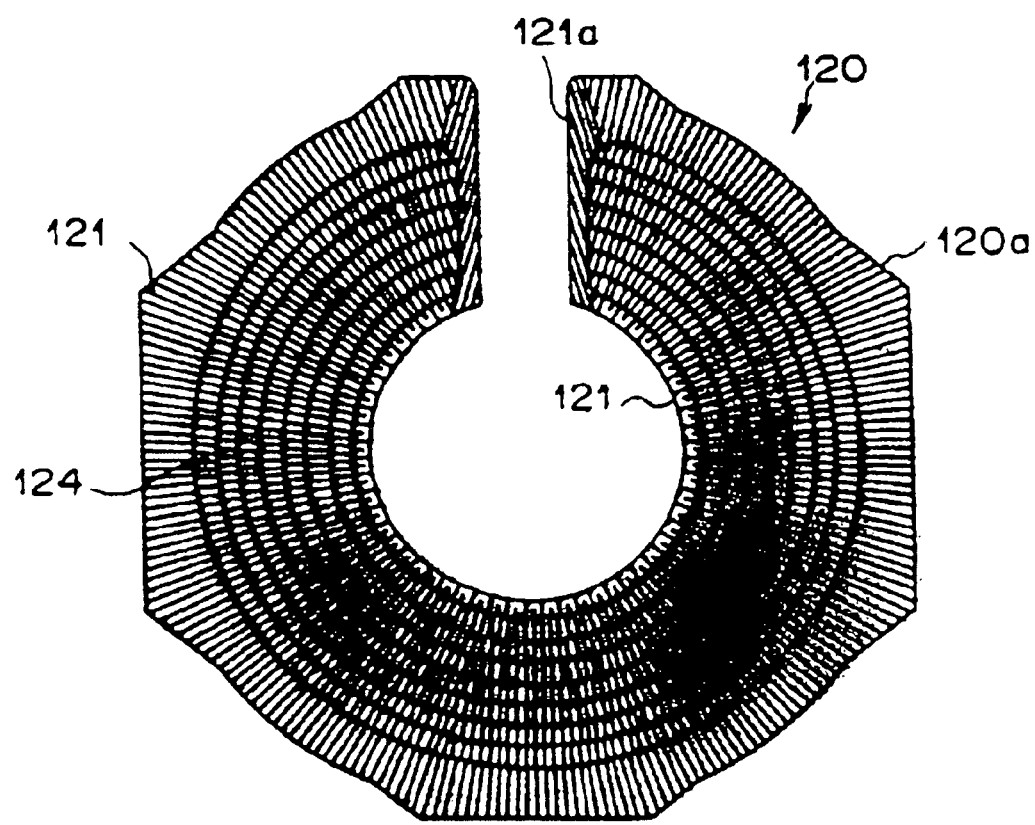
FIG. 8 is a view showing still another example of the welding pattern to be formed on the welding face of the ultrasonic welding horn.

The welding pattern shown in FIG. 8 differs from that shown in FIG. 6 in that the inner side pattern 124 is formed of a plurality of short protrusions which extend in radial directions and are arranged in a plurality of concentric circles. The short protrusions are formed at substantially the same pitches in all the concentric circles. In FIG. 8, the concentric lines in the inner side pattern 124 represent thin grooves and the radial lines represent the protrusions.

Though, in the examples shown in FIGS. 6 to 8, the edge portion pattern 121 is different in form from the inner side pattern 122, 123 or 124, the welding pattern may be the same over the entire area and may be a stripe pattern, a grid pattern, a radial pattern or the like.

In the method of welding the liners 5 and 6 to the upper and lower shell halves 1 and 2, since each liner is welded to the inner surface of the corresponding shell half along the welding pattern over the entire area of the liner, the liner cannot largely bulge even if the liner absorbs moisture, whereby the liner is prevented from contacting the rotating recording medium 4. Accordingly, production of liner dust and increase of the recording medium driving torque can be suppressed.

A method of manufacturing a magnetic disc cartridge in accordance with a third embodiment of the present invention will be described with reference to FIGS. 9 to 16B, hereinbelow.

Figure 9:
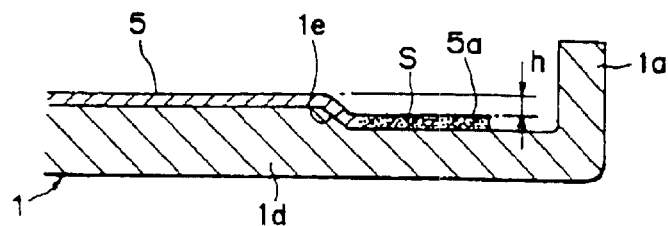
FIG. 9 is a fragmentary cross-sectional view showing an important part of a magnetic disc cartridge manufactured by a method in accordance with a third embodiment of the present invention.

In this embodiment, the surface of the outer peripheral edge portion of each of the liners facing the recording medium 4 is made more distant from the recording medium 4 than the other part of the liner and fixing agent is caused to soak into the edge portion and is solidified there. Since the upper and lower liners 5 and 6 are fixed to the upper and lower shell halves 1 and 2 in the same manner, only the upper liner 5 will be described hereinbelow. As shown in FIG. 9, the upper wall portion 1d of the shell half 1 is provided with an annular recess 1e in its inner surface at a portion opposed to the outer peripheral edge portion 5a of the liner 5 and the outer peripheral edge portion 5a of the liner 5 is fixed to the bottom of the recess 1e so that the surface of the peripheral edge portion 5a facing the recording medium 4 is positioned more distant from the recording medium 4 than the other part of the liner 5. Further fixing agent S is caused to soak into the peripheral edge portion 5a and is solidified there.

The difference h in level or distance from the recording medium 4 between the peripheral edge portion 5a and the other portion of the liner 5 is set to be 0.05 to 0.3 mm. The level difference h may be made in various manners other than by forming a recess in the inner surface of the shell 1 as shown in FIG. 9. For example, the level difference h may be made by compressing the outer peripheral edge portion of the liner 5 with the inner surface of the shell half 5 held flat.

The fixing agent S may be adhesive applied to the liner or may be molten resin obtained by fusing the shell half by applying heat or ultrasonic vibration as will be described later.

Figure 10A:
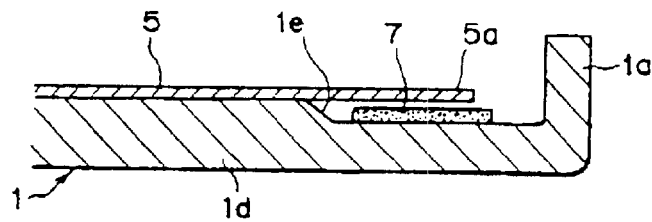
FIGS. 10A and 10B are views for illustrating an example of the method of bonding the liner to the shell half by use of adhesive in the third embodiment.
Figure 10B:
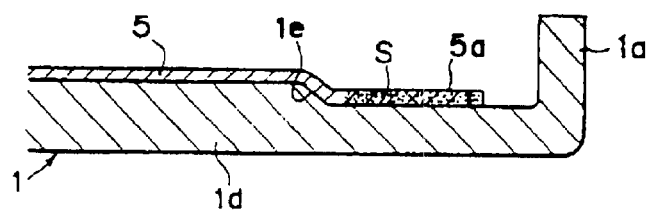

For example, when the fixing agent S is adhesive, an adhesive layer (e.g., ultraviolet-setting adhesive) 7 is formed on the bottom of the recess 1e and the liner 5 is placed on the inner surface of the shell half 1 as shown in FIG. 10A. Then the outer peripheral edge portion 5a of the liner 5 is pressed against the adhesive layer 7, thereby deforming the liner 5 along the recess 1e and causing the adhesive 7 to soak into the peripheral edge portion 5a up to the surface facing the recording medium 4 as shown in FIG. 10B. Then the adhesive 7 is solidified by exposing to ultraviolet rays.

In the example shown in FIGS. 10A and 10B, the liner 5 is bonded to the shell half 1 only at its outer peripheral portion 5a. However the liner 5 may be bonded to the shell half 1 over the entire area thereof. In this case, in order to cause the adhesive to soak into the outer peripheral edge portion 5a, the amount of adhesive applied to the outer peripheral edge portion 5a is increased.

Figure 11A:
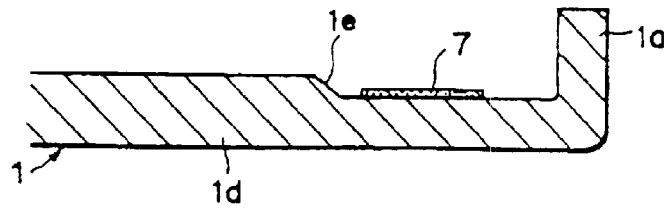
FIGS. 11A to 11C are views for illustrating another example of the method of bonding the liner to the shell half by use of adhesive in the third embodiment.
Figure 11B:
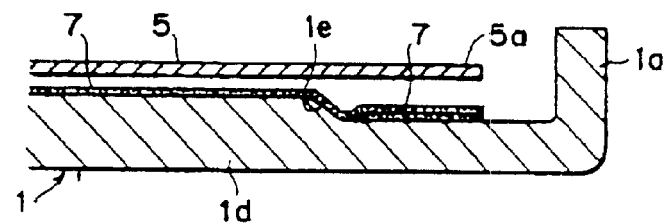
Figure 11C:
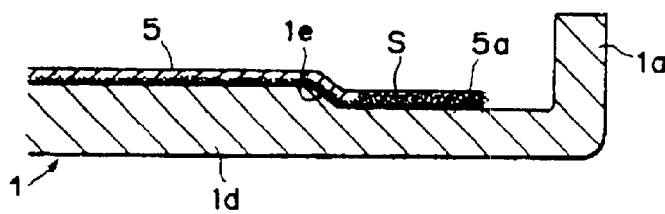

For example, an adhesive layer 7 is formed on the bottom of the recess 1e in a predetermined thickness as shown in FIG. 11A, and then another adhesive layer 7 is formed on the inner surface of the shell half 1 uniformly over the entire area of the liner 5 so that the thickness of the adhesive layer 7 becomes larger at the part opposed to the outer peripheral edge portion 5a of the liner 5 than the other part as shown in FIG. 11B. Then the outer peripheral edge portion 5a of the liner 5 is pressed against the adhesive layer 7, thereby deforming the liner 5 along the recess 1e and causing the adhesive 7 to soak into the peripheral edge portion 5a up to the surface facing the recording medium 4 as shown in FIG. 11C. Then the adhesive 7 is solidified by exposing to ultraviolet rays.

Figure 12A:
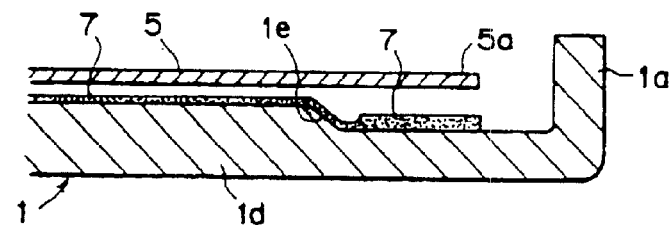
FIGS. 12A and 12B are views for illustrating still another example of the method of bonding the liner to the shell half by use of adhesive in the third embodiment.
Figure 12B:
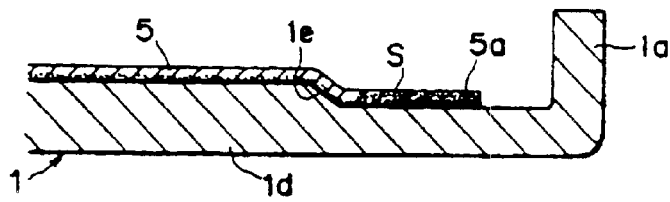

Otherwise, an adhesive layer 7 may be formed at one time on the inner surface of the shell half 1 over the entire area of the liner 5 so that the thickness of the adhesive layer 7 becomes larger at the part opposed to the outer peripheral edge portion 5a of the liner 5 than the other part as shown in FIGS. 12A and 12B.

Figure 13A:
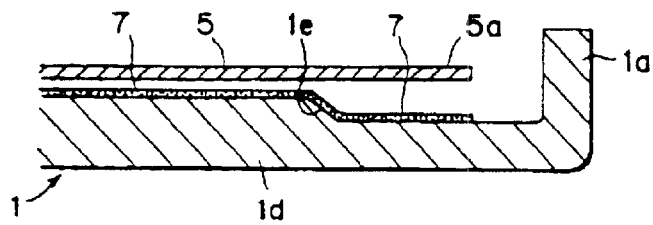
FIGS. 13A to 13C are views for illustrating still another example of the method of bonding the liner to the shell half by use of adhesive in the third embodiment.
Figure 13B:
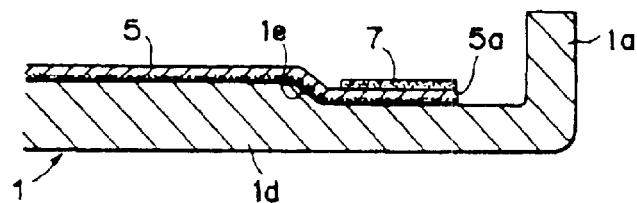
Figure 13C:
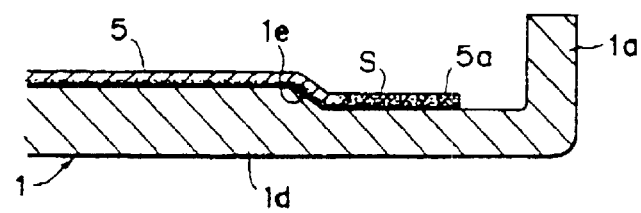

Otherwise, an adhesive layer 7 is formed on the inner surface of the shell half 1 uniformly over the entire area of the liner 5 as shown in FIG. 13A, and then the outer peripheral edge portion 5a of the liner 5 is pressed against the adhesive layer 7 so that the liner 5 is deformed along the recess 1e and another adhesive layer 7 is formed on the outer peripheral edge portion 5a of the liner as shown in FIG. 13B. Then the adhesive layer 7 is caused to soak into the outer peripheral edge portion 5a of the liner as shown in FIG. 13C.

Figure 14A:
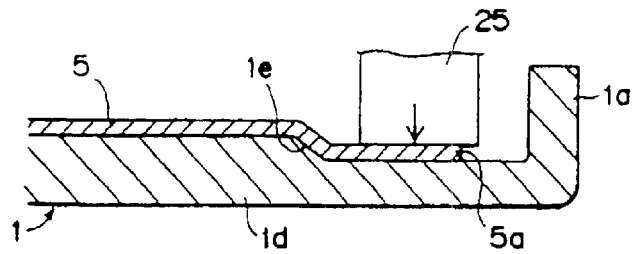
FIGS. 14A and 14B are views for illustrating an example of the method of bonding the liner to the shell half by welding in the third embodiment.
Figure 14B:
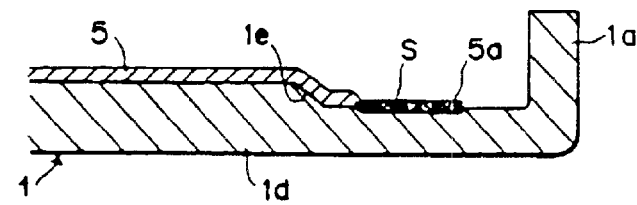
Figure 17:
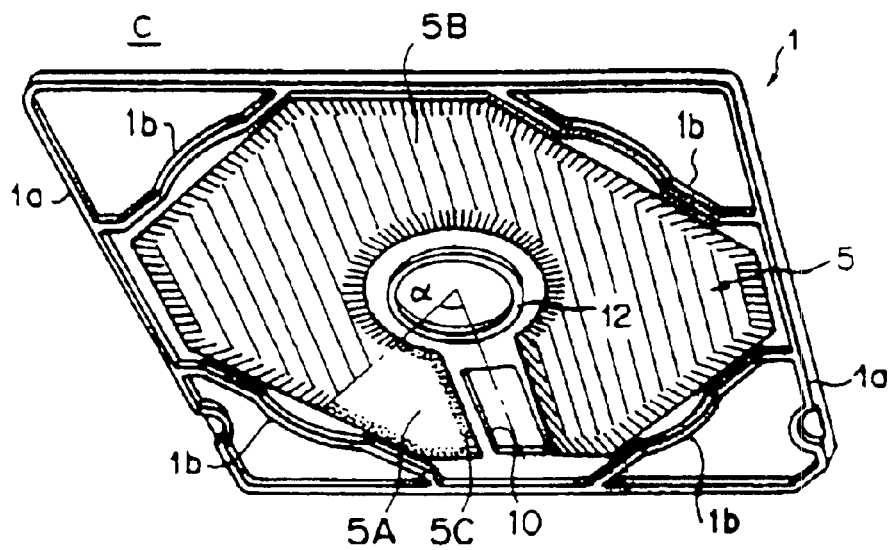
FIG. 17 is an exploded perspective view of a magnetic disc cartridge in accordance with a fourth embodiment of the present invention.
Figure 17:
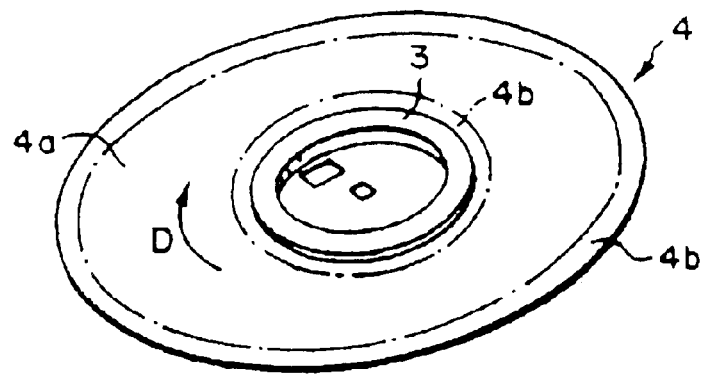
Figure 17:
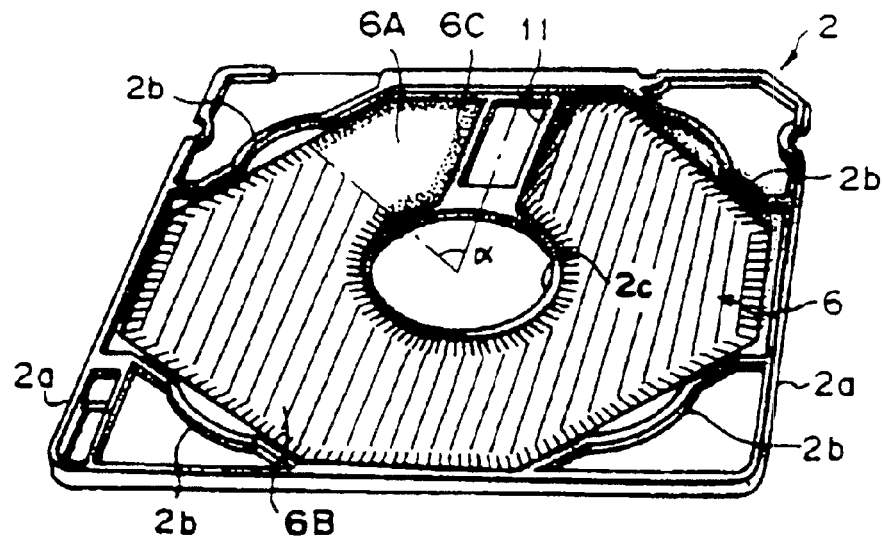

When molten resin obtained by fusing the shell half of ABS resin is used as the fixing agent S, the liner 5 is placed on the inner surface of the shell half 1 and a heater head (or an ultrasonic welding horn) 25 is pressed against the outer peripheral edge portion 5a of the liner 5 as shown in FIG. 14A, thereby fusing the inner surface of the shell half 1 so that molten resin is caused to soak into the outer peripheral edge portion 5a. After the molten resin is solidified, the outer peripheral edge portion 5a of the liner 5 is partly embedded in the inner surface of the shell half 1 as shown in FIG. 14B.

When molten resin obtained by fusing the shell half is used as the fixing agent S, a protrusion pattern 8 like an energy director which is used in ultrasonic welding may be formed on the bottom of the recess 1e as shown in FIG. 15A. In this case, the protrusion pattern 8 is fused and the molten resin of the protrusion pattern 8 is caused to soak into the outer peripheral edge portion 5a of the liner 5 as shown in FIG. 15B.

The protrusion pattern 8 may comprise, for instance, a plurality of stripes as shown in FIG. 16A or a plurality of zigzag protrusions intersecting each other as shown in FIG. 16B.

In the magnetic disc cartridge manufactured by the method of this embodiment, since the outer peripheral edge portion 5a of the liner 5 is more distant from the recording medium 4 than the other part, the outer peripheral edge portion 5a from which fibers are apt to be separated is less apt to be brought into contact with the rotating recording medium 4, whereby fraying of the liner 5 is suppresses and separation of fibers is suppressed. Further by virtue of the fixing agent S, liner dust or the like on the surface of the liner can be prevented from leaving the outer peripheral edge portion 5a of the liner 5.

A magnetic disc cartridge in accordance with a fourth embodiment of the present invention will be described with reference to FIGS. 17 to 20, hereinbelow.

The magnetic disc cartridge of this embodiment is substantially the same as that shown in FIG. 1 and accordingly, the elements analogous to those shown in FIG. 1 are given the same reference numerals and will not be described here. The magnetic disc cartridge of this embodiment mainly differs from that shown in FIG. 1 in that a part of the liners 5 and 6 which is positioned upstream of the magnetic head insertion openings 10 and 11 as seen in the direction D of rotation of the recording medium 4 is not fixed to the inner surface of the shell half. That is, the liner 5 is not welded to the inner surface of the upper shell half 1 at a part 5A upstream of the magnetic head insertion opening 10 as seen in the direction D of rotation of the recording medium 4, and is welded to the inner surface of the upper shell half 1 over the entire area of the other part 5B along welding lines.

Similarly the liner 6 is not welded to the inner surface of the lower shell half 2 at a part 6A upstream of the magnetic head insertion opening 11 as seen in the direction D of rotation of the recording medium 4, and is welded to the inner surface of the lower shell half 2 over the entire area of the other part 6B along a welding pattern.

The welding pattern is formed of short welding lines which are closely spaced from each other at a part along the outer and inner peripheral edges and an edge of the slit of the liner and is formed of a plurality of stripe-like welding lines at the inner part of the liner.

Figure 18:
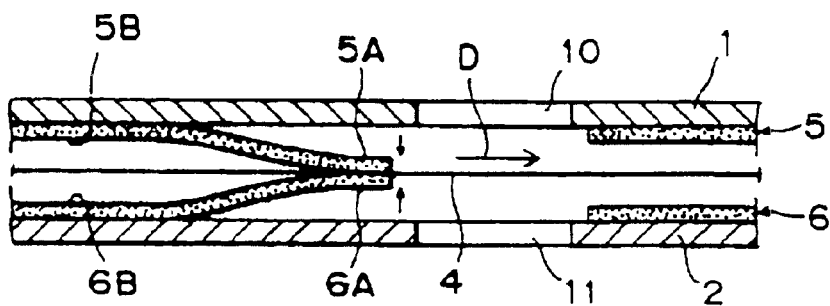
FIG. 18 is a fragmentary cross-sectional view of the magnetic disc cartridge of the fourth embodiment.

As shown in FIG. 18, when the recording medium 4 is rotated at a high speed, the free ends of the non-welded parts 5A and 6A of the liners 5 and 6 near the magnetic head insertion openings 10 and 11 are attracted toward the recording medium 4 by an air flow generated by rotation of the recording medium 4 and brought into contact with the surface of the recording medium 4 under a light pressure.

The edge portions 5C and 6C of the non-welded parts 5A and 6A are subjected to fiber fixing treatment in order to prevent hairiness and separation of fibers. Such fiber fixing treatment may involve, for instance, application and drying of adhesive, or application of heat to hot melt fibers. The portions may be further subjected to chemical dust treatment for enhancing dust adsorbability.

The fiber fixing treatment is carried out at least on the edge portions of the parts of the non-welded parts 5A and 6A which are brought into contact with the recording medium 4 and need not be carried out on the parts which are not brought into contact with the recording medium 4. Of course, the fiber fixing treatment may be carried out over the entire edge portions of the liners 5 and 6.

It is preferred that the non-welded parts 5A and 6A are equal to each other in shape and size so that the recording medium 4 can be stably rotated without wobbling or the like. Further the non-welded parts 5A and 6A are formed so that they are brought into contact with the surface of the rotating recording medium 4 under a light pressure.

Specifically, it is preferred that the non-welded parts 5A and 6A be formed within 60° from the center of the magnetic head insertion windows 10 and 11 as measured in the direction D of rotation of the recording medium 4 ($\alpha \leq 60°$) in view of ensuring sufficient dust wiping action without excessively increasing the recording medium drive resistance.

Since the non-welded parts 5A and 6A are provided upstream of the magnetic head insertion openings 10 and 11 and part of the recording medium 4 which is about to be brought into contact with the magnetic head is wiped, generation of drop-out can be effectively prevented.

Further since the liners 5 and 6 are brought into contact with the recording medium 4 only locally and at the same time they are brought into contact with the recording medium 4 by floating action of the free-end portions of the non-welded parts 5A and 6A, contact of the liners 5 and 6 with the recording medium 4 hardly causes loss of recording medium drive torque and accordingly the recording medium 4 can be stably rotated at a high speed by a small drive motor.

Figure 19:
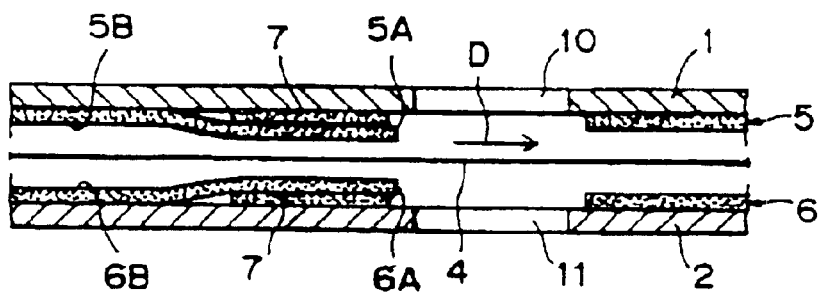
FIG. 19 is a fragmentary cross-sectional view showing a modification of the magnetic disc cartridge of the fourth embodiment.
Figure 20:
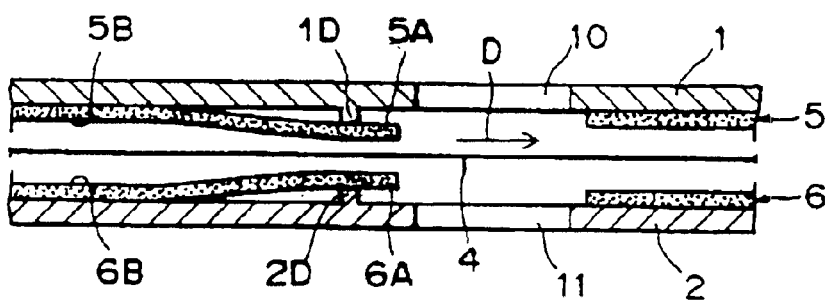
FIG. 20 is a fragmentary cross-sectional view showing another modification of the magnetic disc cartridge of the fourth embodiment.

FIGS. 19 and 20 show a pair of modifications of the magnetic disc cartridge of this embodiment. In the modification shown in FIG. 19, resilient members 7, which are of, for instance, the same material as the liners 5 and 6, are positioned between the non-welded parts 5A and 6A and the inner surfaces of the upper and lower shell halves 1 and 2. The resilient members 7 promote the floating action of the non-welded parts 5A and 6A in response to rotation of the recording medium 4.

In the modification shown in FIG. 20, ribs 1D and 2D are formed on the inner surface of the upper and lower shell halves 1 and 2. The ribs 1D and 2D also promote the floating action of the non-welded parts 5A and 6A in response to rotation of the recording medium 4.

Figure 21:
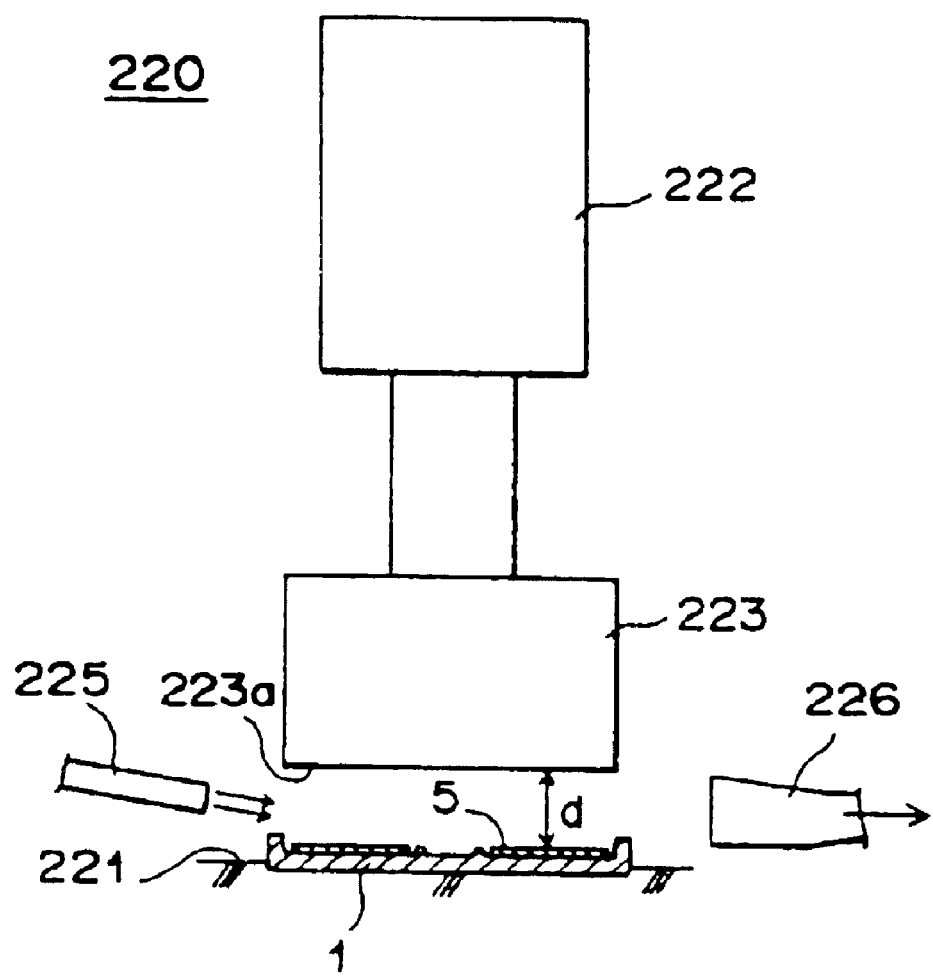
FIG. 21 is a schematic view showing a system for carrying out a method of cleaning a magnetic disc cartridge in accordance with a fifth embodiment of the present invention.

A method of cleaning the liners 5 and 6 in accordance with a fifth embodiment of the present invention will be described with reference to FIG. 21. FIG. 21 shows an example of a liner cleaning system for carrying out the method of the fifth embodiment of the present invention.

The liner cleaning system 220 shown in FIG. 21 is for cleaning the liner 5 (or 6) after it is fixed to the shell half 1 (or 2) and before the shell halves 1 and 2 are assembled into a magnetic disc cartridge. The liner cleaning system 220 comprises a shell half support table 221 on which the shell half 1 with the liner 5 is placed. An ultrasonic welding horn 223 connected to an ultrasonic wave generator 222 is disposed above the shell half support table 221 with its front end face 223a directed downward. The front end face 223a of the ultrasonic welding horn 223 is opposed to the surface of the liner 5 at a predetermined distance d therefrom. An air blow nozzle 225 which blows an air flow against the surface of the liner 5 is disposed on one side of the ultrasonic welding horn 223 and a suction duct 226 which sucks dust blown away the surface of the liner 5 is disposed on the other side of the ultrasonic welding horn 223.

Ultrasonic wave vibration generated by the ultrasonic wave generator 222 is applied to the liner 5 from the front end face 223a of the ultrasonic welding horn 223 and at the same time an air flow is blown against the surface of the liner 5 while the suction duct 226 sucks air. With this arrangement, fiber fractions, dust and the like trapped in the liner 5 are released from the liner 5 by vibration of the liner 5, blown away the liner 5 by the air flow and sucked into the suction duct 226, whereby the liner 5 is removed with fiber fractions, dust and the like.

It is preferred that the ultrasonic wave vibration be not higher than 50 kHz in frequency. More preferably the frequency is in the range of 15 to 25 kHz. The distance d between the front end face 223a of the ultrasonic welding horn 223 and the liner 5 is set to an integral multiple of too a half wavelength of the ultrasonic wave as propagating in the air. For example, when the frequency of the ultrasonic wave is 20 kHz, the half wavelength is {340[m/s]/20[kHz]}×1/2=8.5 mm since the speed of sound in the air at normal temperatures is about 340 m/s. Accordingly, the distance d between the front end face 223a of the ultrasonic welding horn 223 and the liner 5 is preferably 8 mm to 9 mm.

As the frequency of the ultrasonic wave becomes higher, the distance d becomes too short when it is set to a half of the wavelength. Accordingly when the frequency is 40 kHz, the distance d is set to be equal to the wavelength, i.e., 8 mm to 9 mm. However, since as the distance d increases, attenuation becomes larger, it is preferred that the distance d be set to a half of the wavelength.

The amplitude of the front end face 223a of the ultrasonic welding horn 223 should be about 1 to 40 μm (half amplitude) and is preferably 10 to 20 μm in the case where the frequency is 20 kHz. When the amplitude is too large, the liner 5 generates heat and the shell half 1 can be damaged, e.g., deformed or fused, and at the same time, manufacture of the ultrasonic wave generator 222 and/or the ultrasonic welding horn 223 becomes difficult.

The ultrasonic welding horn 223 may be moved back and forth relatively to the liner 5 in a range including an integral multiple of a half wavelength of the ultrasonic wave as propagating in the air. When the distance d is changed while the ultrasonic wave vibration is being applied to the liner 5, vibration of dust in the liner 5 is changed and cleaning action is enhanced. The amount of movement of the ultrasonic welding horn 223 is preferably 0.5 to 2 mm in the case where the frequency is 20 kHz. Generally, the amount of movement of the ultrasonic welding horn 223 is set larger as the frequency becomes lower.

Preferably the ultrasonic wave vibration is applied to the liner 5 for 0.1 to 2 seconds. When the ultrasonic wave vibration is applied to the liner 5 for an excessively long time, the liner 5 generates heat and the shell half 1 can be damaged. Further application of ultrasonic wave of a small amplitude for a long time produced less cleaning action and a best result was obtained by application of ultrasonic wave of an amplitude of 20 μm for 0.5 to 1.5 seconds.

It is preferred that the air blow nozzle 225 be arranged to blow pressurized air obliquely to the liner 5 over a wide area and the suction duct 226 be arranged to suck air over a wide area. When the air blow nozzle 225 is arranged to blow ionized air, static electricity generated by the ultrasonic wave vibration can be eliminated and the cleaning action is enhanced. Further though it is preferred that the air blow nozzle 25 blows air wide over the entire area of the liner 5, it is possible to move a point type nozzle to cause air flow to scan the surface of the liner 5. Further when the air flow is turned on and off at short intervals in a pulse-like fashion, cleaning action can be enhanced.

Though, in the system shown in FIG. 21, the shell half 1 is directed upward with the ultrasonic welding horn 223 directed downward, it is possible to direct downward the shell half 1 with the ultrasonic welding horn 223 directed upward. In this case, dust released from the liner 5 drops away from the liner 5, which is advantageous in effectively removing the dust.

After the liner is cleaned in the manner described above, the upper and lower shell halves 1 and 2 are mated together with the recording medium 4 placed therein and bonded together by ultrasonic welding, whereby a magnetic disc cartridge is assembled.

Figure 22:
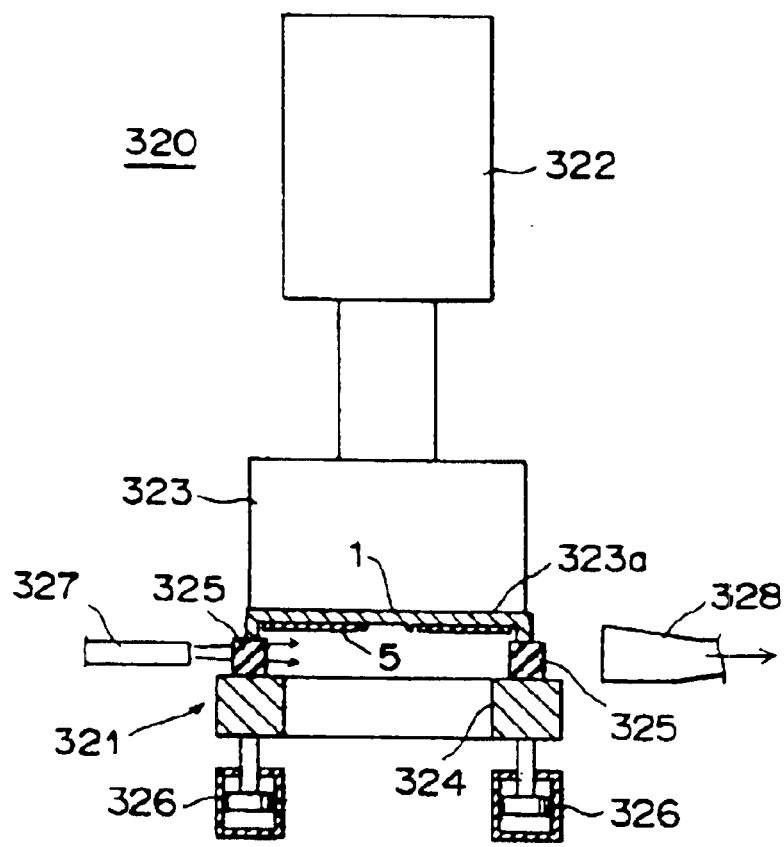
FIG. 22 is a schematic view showing a system for carrying out a method of cleaning a magnetic disc cartridge in accordance with a sixth embodiment of the present invention.

A method of cleaning the liners 5 and 6 in accordance with a sixth embodiment of the present invention will be described with reference to FIG. 22. FIG. 22 shows an example of a liner cleaning system for carrying out the method of the sixth embodiment of the present invention.

The liner cleaning system 320 shown in FIG. 22 is for cleaning the liner 5 (or 6) after it is fixed to the shell half 1 (or 2) and before the shell halves 1 and 2 are assembled into a magnetic disc cartridge. The liner cleaning system 320 comprises a pressure receiving means 321 on which the shell half 1 with the liner 5 is placed with the liner 5 facing downward. An ultrasonic welding horn 323 connected to an ultrasonic wave generator 322 is disposed above the pressure receiving means 321 with its front end face 323a directed downward. The front end face 323a of the ultrasonic welding horn 323 is pressed against the outer surface of the shell half 1.

The pressure receiving means 321 comprises a support frame 324 and an elastic means 325 for supporting the shell half 1 in contact therewith is mounted on the support frame 324. The support frame 324 is supported on a pair of air cylinders 326. The elastic means 325 is formed of an elastic material such as rubber, resin or the like and comprises, for instance, four blocks each supporting one of the four corners of the shell half 1, thereby supporting the shell half 1 with the lower end of the outer ribs 1a spaced from the upper surface of the support frame 324.

An air blow nozzle 327 which blows an air flow against the surface of the liner 5 is disposed on one side of the support frame 324 and a suction duct 328 which sucks dust blown away the surface of the liner 5 is disposed on the other side of the support frame 324.

Ultrasonic wave vibration generated by the ultrasonic wave generator 322 is applied to the shell half 1 from the front end face 323a of the ultrasonic welding horn 323 and at the same time an air flow is blown against the surface of the liner 5 while the suction duct 328 sucks air. With this arrangement, fiber fractions, dust and the like trapped in the liner 5 are released from the liner 5 by vibration of the liner 5, blown away the liner 5 by the air flow and sucked into the suction duct 328, whereby the liner 5 is removed with fiber fractions, dust and the like.

It is preferred that the ultrasonic wave vibration be not higher than 50 kHz in frequency. More preferably the frequency is in the range of 15 to 25 kHz. The amplitude of the front end face 323a of the ultrasonic welding horn 323 should be about 1 to 40 μm (half amplitude) and is preferably 10 to 20 μm in the case where the frequency is 20 kHz. When the amplitude is too large, the shell half 1 generates heat and the shell half 1 can be damaged, e.g., deformed or fused, and at the same time, manufacture of the ultrasonic wave generator 322 and/or the ultrasonic welding horn 323 becomes difficult.

Preferably the ultrasonic wave vibration is applied to the shell half 1 for 0.1 to 2 seconds. When the ultrasonic wave vibration is applied to the shell half 1 for an excessively long time, the shell half 1 generates heat and the shell half 1 can be damaged. Further application of ultrasonic wave of a small amplitude for a long time produced less cleaning action and a best result was obtained by application of ultrasonic wave of an amplitude of 20 μm for 0.5 to 1.5 seconds.

It is preferred that the front end face 323a of the ultrasonic welding horn 323 be pressed against the shell half 1 at a pressure of 10 to 100 gf. When this pressure is excessively high, the contact surface of the shell half 1 with the ultrasonic welding horn 323 or the elastic means 325 can generate heat and can be fused and/or dust is generated.

The elastic means 325 is for suppressing damage on the shell half 1 due to the ultrasonic vibration and is preferably formed of rubber, resin or the like such as those of silicone series or fluorine series which are excellent in heat resistance and durability. It is most preferred that the elastic member 325 be formed of high-expanded silicone rubber. Further since a cut surface of an expanded body is small in cross-sectional area or carrying area, it is preferred that the face of the elastic means 325 in contact with the shell half 1 is a non-cut surface (molded surface). The elastic means 325 may be formed of also a silicone rubber tube inflated at a suitable air pressure in a suitable thickness.

The resilient means 325 should support the shell half 1 so that the surface of the liner 5 is kept open and an air flow between the air blow nozzle 327 and the suction duct 328 is ensured. For this purpose, it is preferred that the elastic means 325 be arranged to support the lower end face of the outer rib 1a of the shell half 1 at a plurality of points such as the four corners and/or some intermediates points or continuously along the sides other than the sides opposed to the air blow nozzle 327 and the suction duct 328.

The air cylinders 326 expands and contracts according to the pressure from the front end face 323a of the ultrasonic welding horn 323 to hold constant the pressure acting on the shell half 1, thereby protecting the shell half 1 from being damaged and ensuring stable vibration of the liner 5.

It is preferred that the air blow nozzle 327 be arranged to blow pressurized air to the liner 5 over a wide area and the suction duct 328 be arranged to suck air over a wide area. When the air blow nozzle 327 is arranged to blow ionized air, static electricity generated by the ultrasonic wave vibration can be eliminated and the cleaning action is enhanced. Further though it is preferred that the air blow nozzle 327 blows air wide over the entire area of the liner 5, it is possible to move a point type nozzle to cause air flow to scan the surface of the liner 5. Further when the air flow is turned on and off at short intervals in a pulse-like fashion, cleaning action can be enhanced.

Though, in the system shown in FIG. 22, the shell half 1 is directed downward with the ultrasonic welding horn 223 directed downward, it is possible to direct upward the shell half 1 with the ultrasonic welding horn 223 directed upward.

Figure 23:
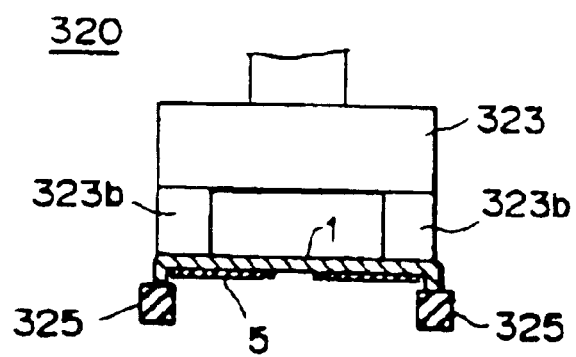
FIG. 23 is a fragmentary view showing a modification of the system shown in FIG. 22.

FIG. 23 shows a modification of the cleaning system shown in FIG. 22. In this modification, the ultrasonic welding horn 323 is pressed against the shell half 1 only at column-like projections 232b. The projections 323b may be formed, for instance, to press the shell half 1 and apply vibration to the shell half 1 only at the four corners where the elastic means 325 supports the shell half 1. That is, the projections 323b may be formed to press the shell half 1 in positions where the shell half 1 is less apt to be deformed by application of ultrasonic vibration, e.g., positions along the outer periphery of the shell half 1 or positions where the elastic means 325 supports the shell half 1. The position of the projections 323b may be changed according to the form of the elastic means 325.

What is claimed is:

1. A method of manufacturing a magnetic disc cartridge comprising a casing formed of upper and lower shell halves mated together, a disc-like recording medium supported for rotation in the casing and a liner fixed to each of the inner surfaces of the upper and lower shell halves by ultrasonic welding by use of an ultrasonic welding horn, the liner having an outer contour defined by an outer peripheral edge, a central opening defined by an inner peripheral edge, and a slit-like cutaway portion defined by a pair of linear edges extending between the outer peripheral edge and the inner peripheral edge, which method is characterized in that said ultrasonic welding horn is provided with a welding pattern in the form of a protrusion pattern formed on a welding face thereof over the entire welding area in which the ultrasonic welding horn is brought into contact with the liner, and the liner is welded to the inner surface of the shell half over the entire area of the liner along the welding pattern, and wherein the welding face of the welding horn has substantially the same shape and dimensions as the liner.

2. A method as defined in claim 1 in which said welding pattern is selected from a group consisting of a longitudinal stripe pattern, a transverse stripe pattern, a grid pattern and a radial pattern.

3. A method as defined in claim 1 in which the welding pattern is uniformly spaced over the entire area of the liner opposed to the recording area of the recording medium.

4. A method as defined in claim 1 in which the welding pattern is formed of a continuous protrusion.

5. A method as defined in claim 1 in which the welding pattern is formed of a plurality of discontinuous protrusions.

6. A method as defined in claim 1 further comprising the step of cleaning said disc-like recording liners respectively fixed to the inner surfaces upper and lower shell halves, wherein the step of cleaning said liners further comprises;

positioning each of the shell halves bearing thereon the liner fixed thereto with the surface of the liner opposed to a front end face of an ultrasonic welding horn at a predetermined space therefrom, vibrating the liner by ultrasonic wave radiated from the front end face of the ultrasonic welding horn, and blowing an air flow against the surface of the liner.

* * * * *